(12) United States Patent
Britton et al.

(10) Patent No.: US 6,767,028 B2
(45) Date of Patent: Jul. 27, 2004

(54) STROLLER

(75) Inventors: Daniel William Britton, Calgary (CA); Miller Karl Mack, Calgary (CA)

(73) Assignee: 634182 Alberta Ltd., Calgary (CA)

( * ) Notice: Subject to any disclaimer, the term of this patent is extended or adjusted under 35 U.S.C. 154(b) by 0 days.

(21) Appl. No.: 09/925,726

(22) Filed: Aug. 10, 2001

(65) Prior Publication Data
US 2002/0041083 A1 Apr. 11, 2002

(30) Foreign Application Priority Data
Aug. 10, 2000 (CA) .............................................. 2316013

(51) Int. Cl.⁷ ................................................ B62B 7/06
(52) U.S. Cl. ..................... 280/644; 280/650; 280/47.38
(58) Field of Search ................................. 280/650, 647, 280/642, 643, 644, 655.1, 47.38, 47.41, 47.371

(56) References Cited

U.S. PATENT DOCUMENTS

| | | | | |
|---|---|---|---|---|
| 4,191,397 A | * | 3/1980 | Kassai | 280/647 |
| 4,317,581 A | * | 3/1982 | Kassai | 280/644 |
| 4,697,823 A | * | 10/1987 | Kassai | 280/644 |
| D293,776 S | | 1/1988 | Maard | |
| 5,622,376 A | * | 4/1997 | Shamie | 280/642 |
| 5,622,377 A | * | 4/1997 | Shamie | 280/642 |
| 5,660,435 A | | 8/1997 | Eichhorn | |
| 5,695,212 A | | 12/1997 | Hinkston | |
| 5,775,718 A | * | 7/1998 | Huang | 280/642 |
| 5,887,889 A | | 3/1999 | Andrus | |
| 5,988,670 A | * | 11/1999 | Song et al. | 280/648 |
| 6,056,306 A | | 5/2000 | Rust et al. | |
| 6,086,086 A | * | 7/2000 | Hanson et al. | 280/650 |
| 6,155,628 A | | 12/2000 | Williams | |
| 6,270,111 B1 | * | 8/2001 | Hanson et al. | 280/650 |
| 6,357,784 B1 | * | 3/2002 | Mitzman | 280/642 |
| 2002/0113414 A1 | * | 8/2002 | Tomasi et al. | 280/650 |

* cited by examiner

Primary Examiner—Avraham Lerner
(74) Attorney, Agent, or Firm—Bennett Jones LLP

(57) ABSTRACT

A stroller is described that is foldable and includes a tracking adjustment mechanism. The stroller is folded by pivoting the main frame members about one pair of main connecting brackets. Handle height adjustment can be made at the bracket. Some foldable frame cross members are formed of cable, rather than tubing to reduce the weight and folded size of the stroller over stroller having foldable cross members formed of tubing. A stroller having adjustable wheel spacing for tracking and stroller center of gravity adjustment is also described.

40 Claims, 9 Drawing Sheets

STROLLER

FIELD OF THE INVENTION

This invention is directed to a stroller and, in particular, to a stroller that can be folded for storage.

BACKGROUND OF THE INVENTION

In recent years, many developments have been made with respect to strollers. In particular, the folding features and handleability of strollers have been improved and strollers have been developed for use while jogging or in-line skating, over rugged terrain and through snow and sand.

While some previously available strollers are foldable, many folding systems are complex both in terms of use and in terms of manufacture. The various cross members required to permit folding while maintaining stroller frame rigidity can increase the weight of the stroller to undesirable levels and add to the bulk of the folded trailer.

The use of strollers is often uncomfortable because the gripping portion of the stroller handle is at an incorrect height for the user. While some strollers include mechanisms for handle height adjustment, these mechanisms are often not user friendly. The mechanisms generally require the installation of an adjustment connection near the gripping portion which can weaken the handle and which complicates stroller construction, thereby increasing stroller cost.

A common problem with previous strollers is the tendency for their wheels to move out of alignment, thereby adversely affecting stroller tracking. In particular, the front wheel or wheels can become off-centre or out of parallel position relative to the rear wheels.

Many strollers do not provide a mechanism for adjusting the stroller's center of gravity, except by adjusting the position of the child or bags etc. loaded into the stroller. Therefore, the weight on the front forks can't be reliably adjusted and the performance of the stroller cannot be controlled in this respect.

A stroller is needed that overcomes at least some of these problems of previous strollers.

SUMMARY OF THE INVENTION

The stroller of the present invention overcomes some of the problems set out above with respect to previous strollers. A stroller folding system is disclosed which is simple with respect to both use and manufacture and includes foldable cross members that are light-weight and durable. Stroller mechanisms are also disclosed for correcting tracking problems and to select handle height.

One stroller according to the present invention can be folded for storage and transport. The stroller includes three main structural units that pivot relative to each other at closely positioned pivotal axes. The pivotal axes are defined by a pair of brackets aligned one on each side of the stroller and into which each of the three main structural units are connected. This permits stroller construction to be simplified since only one pair of brackets is needed to be formed and mounted into the frame and many mechanical connections on the stroller are made through that pair of brackets. The procedure by which the stroller is folded is also simplified by use of the pair of aligned brackets in the present stroller.

In accordance with a broad aspect of the present invention, there is provided a stroller having a forward end and a rear end and a long axis extending through the forward end and the rear end, the stroller comprising: a plurality of wheels for supporting the stroller including at least one forward wheel positioned forward of the stroller's centre of gravity and rear wheels; a frame supported by the wheels having main frame members including front wheel supports for engaging the at least one front wheel, a handle bar for grasping and moving the stroller and rear wheel supports for engaging the rear wheels; a connecting bracket on each side of the frame having connected thereto the main frame members and at least two of the main frame members being pivotally moveable at their connection to the connecting brackets and the connecting bracket positioned to permit the at least two main frame members to pivot about the bracket such that the stroller can be manipulated between an upright position and a folded position; and a locking means for releasably locking the stroller in the upright position.

As will be appreciated, in a three-wheeled stroller there will generally be a single front wheel supported on front forks and a pair of rear wheels. In a four-wheeled stroller the frame will generally be supported on four wheels, with two forward and two at the rear. Generally, the rear wheel supports will be connected such that they pivot together during manipulation of the frame, as will the front wheel supports in a four-wheeled stroller.

In one embodiment, the front wheel supports are rigidly connected to the connecting brackets, while the handle and rear wheel supports are pivotally connected to the connecting brackets. This arrangement provides a compact configuration when the stroller is in the folded position. In addition, this has been found to particularly facilitate the unfolding operation of the stroller since by simply lifting the folded stroller by the front wheel supports, the rear wheel supports will rotate down and away and the stroller will automatically be in a configuration in which it can be supported on its wheels.

The frame of the stroller can be formed of various rigid materials including, but not limited to, aluminum or polymeric tubing, rods or bars. The frame can include frame cross members for providing locking the stroller into a rigid position or maintaining positioning of stroller components. These frame cross members can also be formed of aluminum or polymeric tubing, rods or bars or can alternately be formed of flexible cables, as will be discussed in more detail. The frame supports a seat for accepting one or more children and, if desired, a covering or sunshade to shelter the seat. In one embodiment, the seat includes a drink bottle pocket formed in the forward part of the seat, which is accessible by a child positioned in the seat. Preferably the pocket is positioned in the seat in the area between a child passenger's legs. In another embodiment, the sunshade includes a visor including a stiffening member permitting the visor to be set in a stationary in-use position. Preferably, the stiffening member is adjustable such that it can be moved between the stationary in-use position and a stored position.

The handle can be formed in any way to facilitate grasping and control of the stroller. Preferably, the handle is height adjustable to be comfortable for users of various height. In one embodiment, the connecting bracket includes a mechanism for handle height adjustment. Preferably, the mechanism is incorporated into the handle's pivotal connection to the connecting bracket.

To provide frame rigidity the rear supports can have extending therebetween a cross bar or an axle. The frame can also include other cross members such as one extending between the front wheel supports and the rear supports.

The wheels are selected to support the frame and permit it to be rolled as by pushing. The wheels can be of any desired size. Preferably, the wheels are mounted to rotate in planes parallel with the long axis of the stroller and are restricted from pivoting out of these planes. A relative wheel positioning mechanism can be mounted on the stroller to permit adjustment of relative wheel alignment and/or spacing for tracking or center of gravity adjustment.

The locking means can be any mechanism or part for locking frame members in an upright position. As an example, the locking means can be pins, fasteners, over-center mechanisms, etc.

Another stroller according to the present invention includes at least one flexible elongate cross member extending to act between main frame members. The cross member is connected to act between main frame members to maintain or limit their spacing and is particularly useful for extending between main frame members that are pivotable relative to each other and for being placed in tension between main frame members. The flexible elongate cross member can in some applications replace a stiff cross member, thereby reducing stroller complexity, folded size and weight.

Thus, according to another broad aspect of the present invention, there is provided a stroller having a forward end and a rear end and a long axis extending through the forward end and the rear end, the stroller comprising: a plurality of wheels for supporting the stroller including at least one front wheel positioned forward of the stroller's centre of gravity and rear wheels; a frame supported by the wheels having main frame members including (a) front wheel supports for engaging the at least one front wheel, (b) a handle bar for grasping and moving the stroller and (c) rear supports securing and extending upwardly from the rear wheels; and a flexible, elongate cross member extending to act between at least two of the main frame members to control the spacing between the main frame members.

The flexible elongate cross member can be, for example, a strap, a cord, a chain or a cable. Preferably, the flexible elongate member is substantially inextensible so that the length of the cross member once in tension between two main frame members will limit the degree to which they can be separated. However, in one embodiment, the cross member has a capability of limited stretch under loads beyond a selected level so that it provides a suspension effect.

In one embodiment, the flexible elongate member is secured in fixed positions on the at least two main frame members between which it extends. In another embodiment, the flexible elongate member is secured to stroller components connected to main frame members, but through which the flexible elongate member can act to adjust the spacing between the main frame members. In another embodiment, the stroller includes a tension adjustment means for selecting the tension in the flexible elongate member as it extends between the main frame members. Various tension adjustment means such as, for example, threaded connections, turn buckles, clamps and levers are useful with the stroller.

In one stroller according to the present invention, the flexible elongate member is included in an over-center mechanism for providing frame rigidity between two main frame members. In another stroller according to the present invention, the flexible elongate member acts between the front wheel supports and the rear supports to limit the spacing therebetween.

There are various situations wherein it is desirable to adjust the spacing between the front and rear wheels. For example, the stroller center of gravity, and thereby the weight placed on the front wheel or wheels, can be controlled in part by adjusting the space between the front and rear wheels. In addition, due to manufacturing or wear and tear, the spacing and alignment between the wheels can tend to cause a stroller to lose its ability to track straight Thus, another stroller according to the present invention includes a means for relative wheel positioning, for example, to adjust stroller center of gravity and/or tracking.

Thus, according to yet another broad aspect of the present invention, there is provided a stroller having a forward end and a rear end and a long axis extending through the forward end and the rear end, the stroller comprising: a plurality of wheels for supporting the stroller including at least one front wheel positioned forward of the stroller's centre of gravity, a left rear wheel and a right rear wheel; a frame supported by the wheels including front wheel supports securing and extending rearwardly from the at least one front wheel, a handle bar for grasping and moving the stroller, a left rear support securing and extending upwardly from the left rear wheel and a right rear support securing and extending upwardly from the right rear wheel; and a relative wheel positioning means for selecting and maintaining the spacing of the at least one front wheel relative to at least one of the left rear wheel and the right rear wheel.

The relative wheel positioning means is useful for strollers supported on both three and four wheels. In a three-wheeled stroller, the relative wheel positioning means includes a mechanism for adjusting the spacing between the front wheel and each of the left and right rear wheels. In a four-wheeled stroller, the relative wheel positioning means includes a mechanism for adjusting the spacing between the right-side front and rear wheels and the left-side front and rear wheels.

In one embodiment, the relative wheel positioning means is two elongate members each one extending to act between the front wheel supports and one of the rear supports to control the spacing therebetween. In a three-wheeled stroller each elongate member extends between the front forks and one of the rear supports. In a four wheeled stroller, the elongate members can extend between the front and rear wheels in a parallel or a cross pattern. Each of the elongate members is substantially inextensible. The elongate members can each include a mechanism for selecting its extended length. Preferably, the mechanism for adjusting the length of the elongate member can be actuated to adjust the length while the elongate member remains connected between the front wheel support and its rear support. The mechanism for adjusting the length can be a threaded connection in the elongate member or between the elongate member and one of the supports, a telescoping member, a turn buckle, etc. In one embodiment, while the elongate members are substantially inextensible, they have limited elasticity such that loads over a selected level will cause the elongate members to stretch slightly to provide for suspension effect. In one embodiment, the elongate members each include a flexible elongate portion. The flexible elongate portion can be for example, formed of cable, chain, strap, etc. The use of a flexible portion facilitates folding of the stroller.

According to another broad aspect of the present invention, there is provided a stroller having a forward end and a rear end and a long axis extending through the forward end and the rear end, the stroller comprising: a plurality of wheels for supporting the stroller including at least one front wheel positioned forward of the stroller's centre of gravity, a left rear wheel and a right rear wheel; a frame supported by the wheels including front wheel supports securing and extending rearwardly from the at least one front wheel, a left rear support securing and extending upwardly from the left rear wheel, a right rear support securing and extending upwardly from the right rear wheel; and a handle bar for grasping and moving the stroller, the handle bar being connected into the frame by a pivotal connection and the pivotal connection being incorporated into a mechanism for handle height adjustment with respect to the stroller.

In one embodiment, the pivotal connection includes a pin secured to the handle and slidably engaged in a slot on the frame. The pin is slideably moveable in the slot between a first position and a second position, to drive the handle against a fixed fulcrum such that the gripping portion of the handle is moved into a higher position when the pin is in the first position and the gripping portion of the handle is in a lower position when the pin is in the second position. A releasable lock is provided to maintain the pin in the first position or the second position during use.

The features of (i) a pair of brackets onto which all main frame members are secured and about which selected main frame members pivot for folding; (ii) flexible cross members, (iii) relative wheel positioning means and (iv) handle height adjustment can all be used on the same stroller or individually or in combination on any particular stroller, as desired.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION OF THE PREFERRED EMBODIMENTS

Referring to FIGS. 1 to 6, a stroller 10 according to the present invention is shown. The stroller can be used to transport a child. The stroller shown is a three-wheeled model but it will be apparent that the inventive features can be applied to a four wheel stroller directly or with only slight modification.

Figure 9:
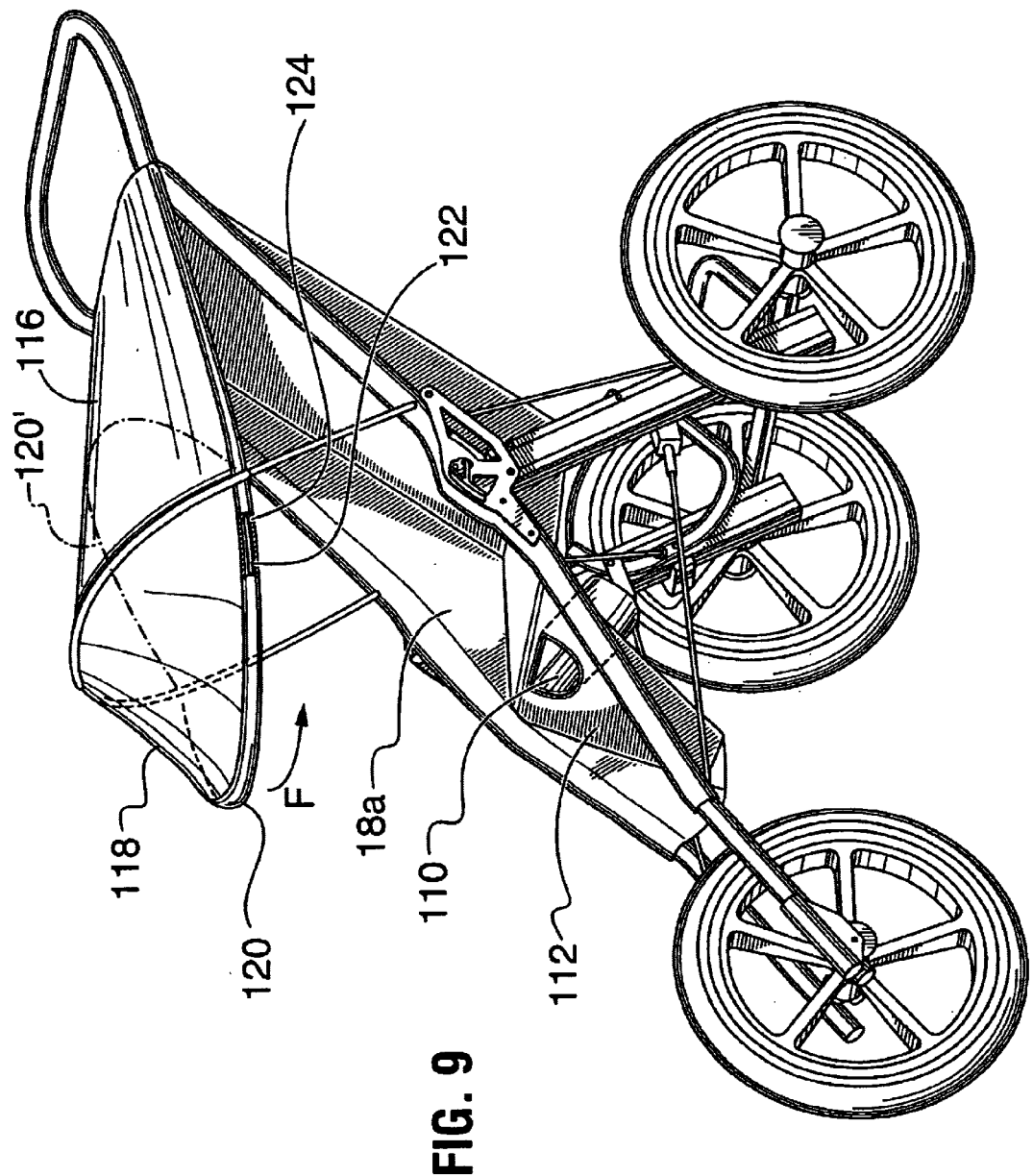
FIG. 9 is view of the stroller of FIG. 7 with a seat and sun shade fitted thereon. A portion of the sun shade visor is cut away to expose the inner components thereof.

Stroller 10 includes a frame 12 supported on a front wheel 14 and two rear wheels 16a, 16b. Large diameter wheels, as shown, are preferred as they provide a smoother ride and greater stability over rough terrain and at jogging speeds. Frame 12 supports a seat 18 and a support 19 for a sun shade. The seat and sun shade or enclosures, if any, can be any desired configuration on the frame. However, a preferred embodiment of a seat and sun shade is illustrated in FIG. 9. The seat has been removed from the stroller in FIGS. 2 to 6 to facilitate illustration of the embodiments of the invention.

The frame includes a handle 20 for pushing the stroller, front forks 22 and rear supports 24. Handle 20 is generally a U-shaped member having forward ends 20' and a gripping portion 21.

Front forks 22 taper from upper ends 22' to front end 22" where the axle 26 of the front wheel is mounted. A quick release mechanism, as is known, is preferably provided at this connection to facilitate removal of the front wheel for storage. Front forks 22 include a strengthening cross bar 27.

Rear supports 24, including left and right rigid elongate members, engage at their lower ends 24" a common rear axle 28 for rear wheels 16a, 16b. The common axle serves to provide rigidity to the rear supports one relative to the other. Quick release mechanisms can also be used between the axle and the rear wheels.

The handle, front forks and rear supports are connected together at a bracket 30 on each side of the stroller. Preferably, the stroller is constructed to be folded about the connections between the frame components and the brackets. Thus, any pivotal connections between any one of the frame components and the brackets on either side of the stroller are aligned so that they work in unison.

Figure 5:
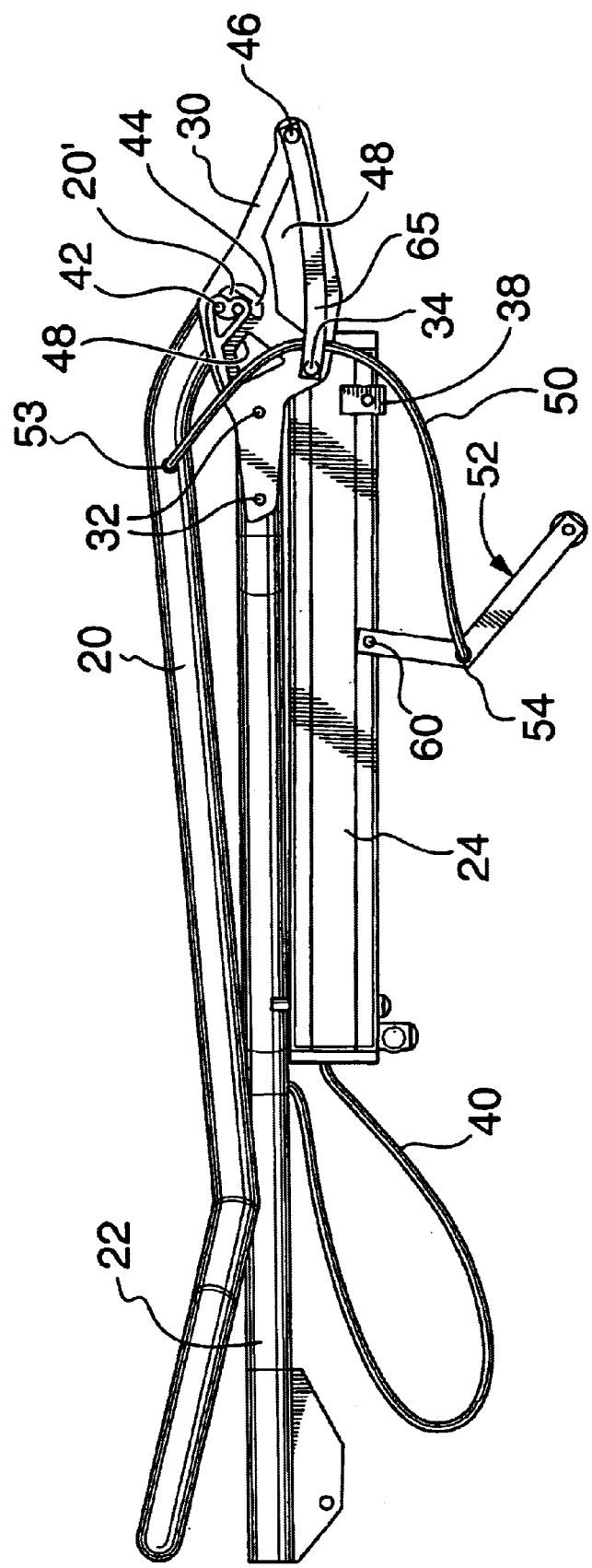
FIG. 5 is a side elevation view of the stroller of FIG. 1 in folded configuration with the wheels removed.

In a preferred embodiment, as shown, front forks 22 are rigidly secured, as by use of fasteners 32, to brackets 30. Rear supports 24 are each pivotally connected to the bracket by pins 34 passing through holes in the brackets. Rear supports 24 together can pivot about pins 34 toward the underside of the front forks, as shown by arrow A in FIG. 2, until they are in a folded configuration under the front forks (FIG. 5). At least one, and preferably both, rear supports have mounted thereon a stop 38 that abuts against at least one bracket 30 to limit rotation of the rear supports about pins 34. As will be appreciated, generally at least some of the weight of the stroller load is accommodated through the stops. Thus, the stops are formed to withstand and effectively transfer that load. Pivotal movement about pins 34 away from the front forks is also limited by cables 40 which are flexible but substantially inextensible. A cable 40 is connected between front forks 22 and each rear support 24. It is useful to use the cables 40 together with stops 38 to enhance the absorption of forces during application of extreme loads, preventing, for example, bending of the front forks.

Being flexible, for example, made of steel braided cable or a polymeric cord, cables 40 can fold when rear supports 24 are folded toward forks 22. Thus, cables 40 strengthen the frame, maintain the spacing between the front and rear wheels and permit folding while being light-weight and simple and economical to use in stroller construction. The cables are useful in tracking and center of gravity adjustment, as will be described hereinafter. While the cables are substantially inextensible, they preferably have limited stretch when placed under extreme tensile loads and as such provide a degree of shock absorption. However, any degree of stretch should not interfere with the primary purpose of the cables which is to maintain or limit the spacing between the wheels. Alternatively, to provide for suspension, a shock absorbing means such as an elastomeric plug (not shown) can be positioned to act at the attachment of the cables to the front forks and/or rear wheel supports.

Handle 20 is pivotally connected at ends 20' through pins 42 to brackets 30. Pins 42 ride in slots 44 and permit the handle to pivot relative to the brackets. The handle can be pivoted at pins 42 toward the topside of the front forks, as shown by arrow B in FIG. 2, until they are in a folded configuration on the front forks (FIG. 5). Brackets 30 includes stops 46 for limiting rotation of the handle away from the front forks. Stops 46 can be structures mounted into or formed integral with the brackets.

Brackets 30, as will be appreciated, must be formed of durable yet easily formed materials such as, for example, polymeric materials or aluminum. To reduce the weight and amounts of materials required to form a bracket, openings 48 can be formed in non-functioning areas, provided the strength of the bracket is not compromised.

Figure 1:
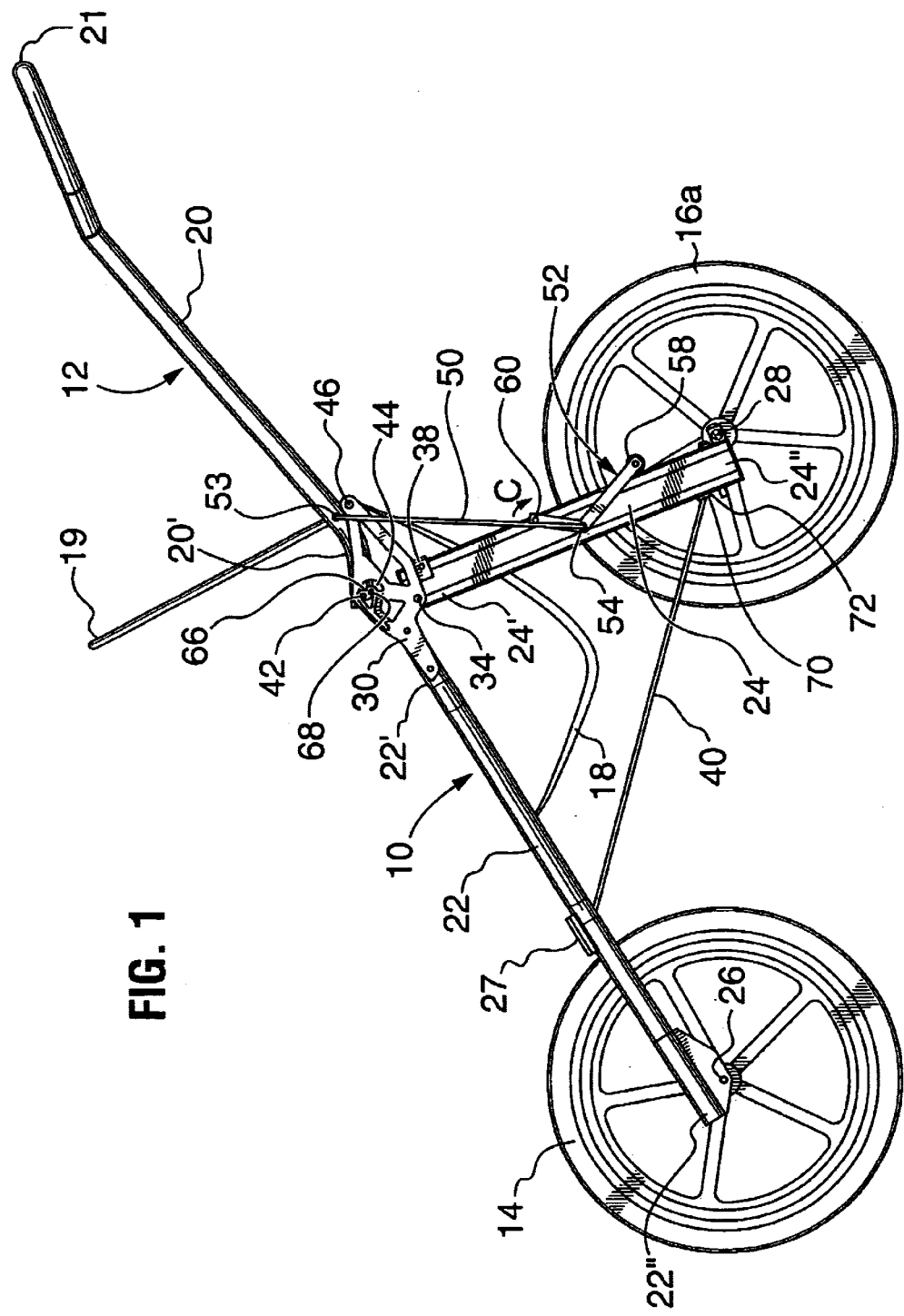
FIG. 1 is a side elevation view of a stroller according to the present invention in an upright, locked position ready for use. The left rear wheel has been removed to facilitate illustration.

It will be appreciated that the stroller can be set up into an unfolded configuration by simply pivoting the handle and the rear supports away from the front forks and placing the stroller on its wheels. However for proper use of the stroller, handle 20 and rear supports 24 must be locked into their fully unfolded configurations, as shown in FIG. 1. While a plurality of locks could be used, preferably a lock is used that when actuated releases both the handle and the rear supports for pivotal movement such that separate actuation of a lock for each frame member is avoided. In a preferred embodiment, the lock when actuated releases or locks the handle and the rear supports substantially simultaneously. In the illustrated embodiment, lock cables 50 and over centre clamp 52 lock both (i) rear supports 24 against stops 38 and/or the tension in cables 40 and (ii) handle 20 against stops 46. Cables 50 are substantially inextensible and formed, for example, of braided steel cable. The cables are positioned one on each side of the stroller and are fixedly secured to handle 20 at connections 53 and to overcentre clamp 52 at connections 54. Overcentre clamp 52 includes side members 56 and a handle 58 extending therebetween. The side members of the clamp are pivotally connected by pins 60 to rear supports 24. Other clamp configurations can be used, such as a clamp handle centrally positioned between the rear supports or a molded one piece clamp.

Figure 2:
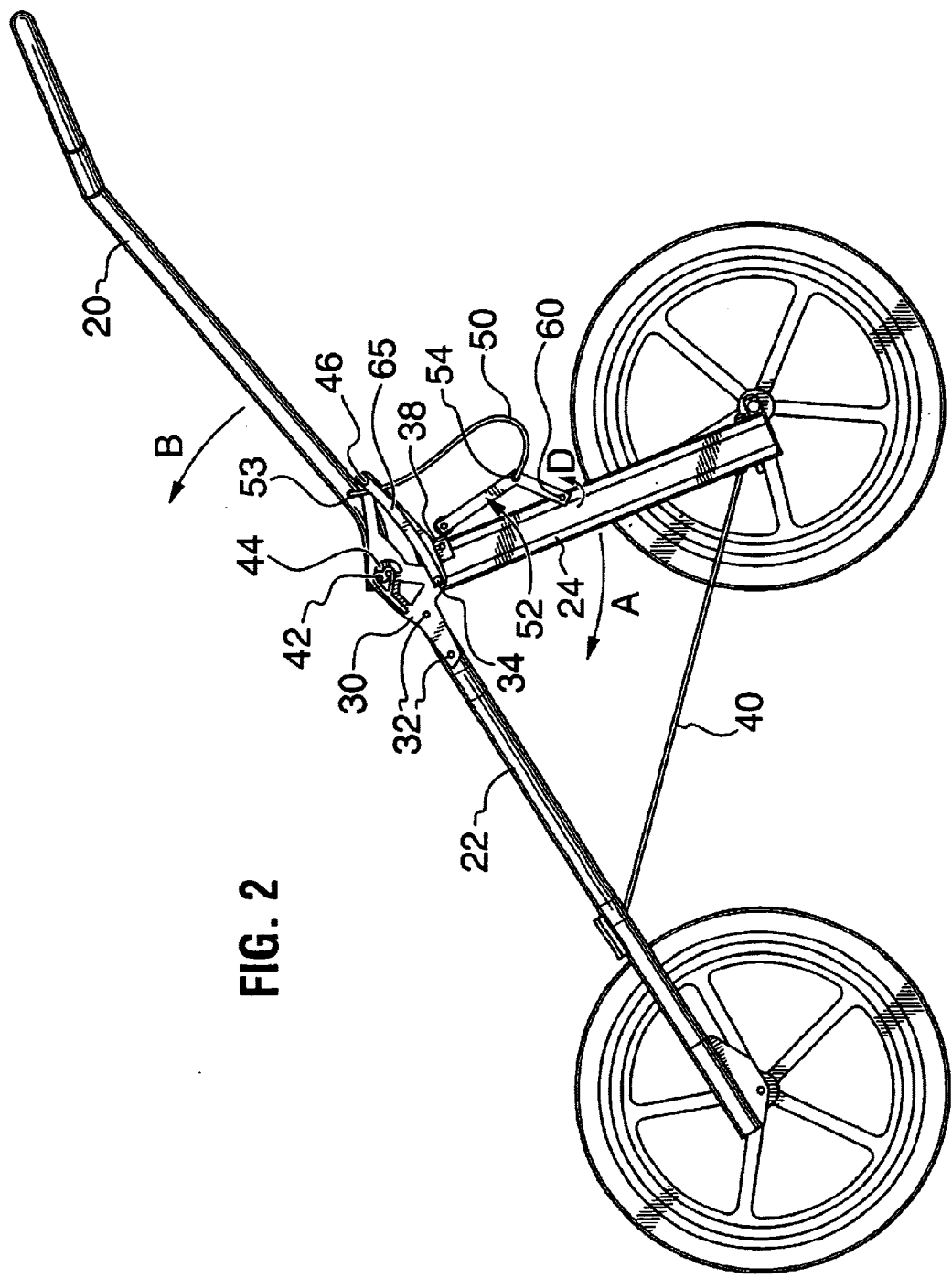
FIG. 2 is a side elevation view of the stroller of FIG. 1 with the seat removed and in upright, unlocked position ready for folding. The left rear wheel has been removed to facilitate illustration.
Figure 3:
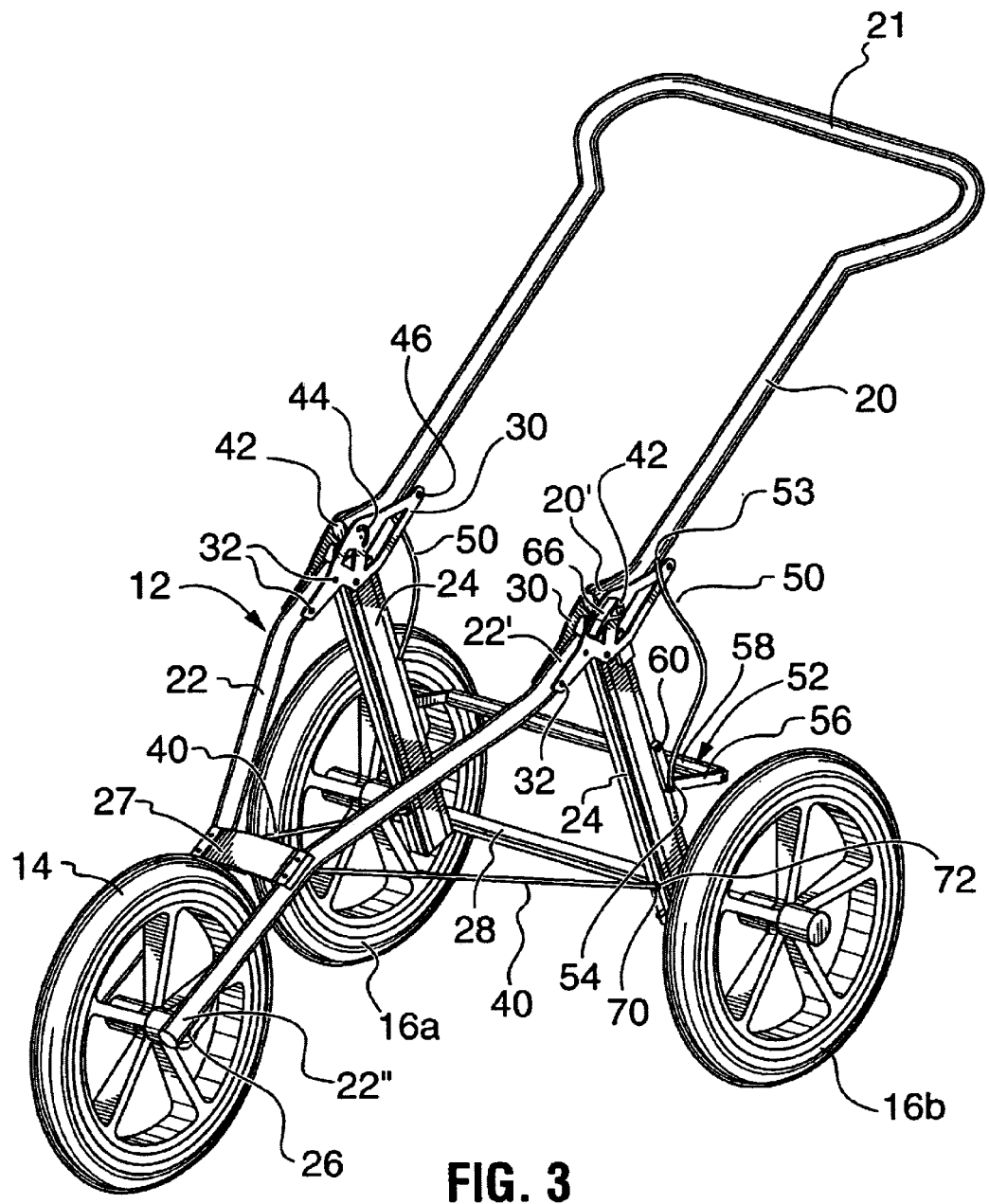
FIG. 3 is a perspective view of the stroller of FIG. 2.
Figure 4:
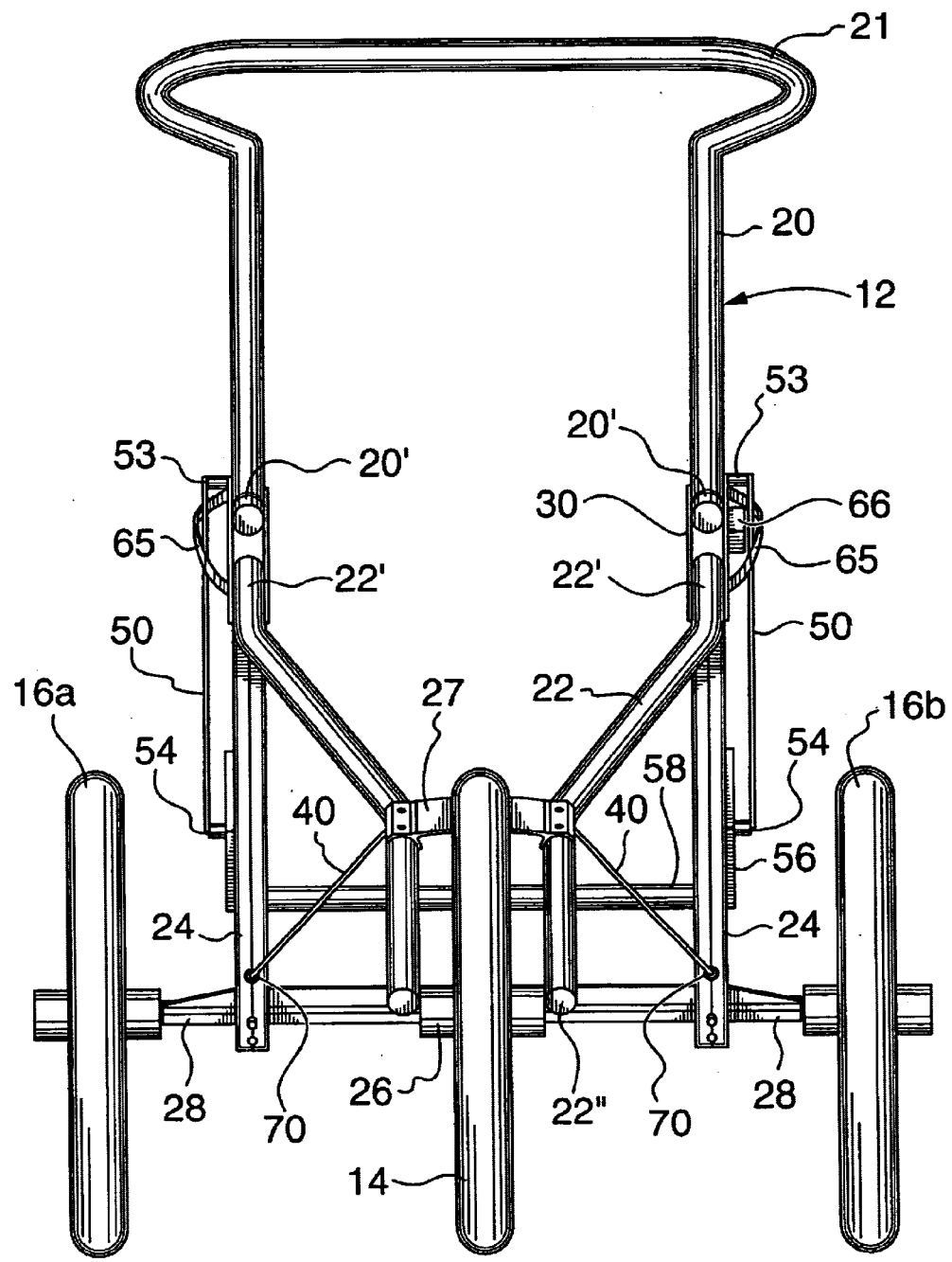
FIG. 4 is a front elevation view of the stroller of FIG. 1 with the seat removed.

Cables 50 are selected to be of a length just slightly less than the maximum distance between connections 53 and connections 54. Once the stroller is set up on its wheels with handle 20 resting against stops 46, the lock can be actuated. To actuate the lock, over centre clamp 52 is pivoted about its connection to the rear members. In particular, to lock the handle and rear supports into their fully extended positions, the overcentre clamp is rotated down away from handle 20, as indicated by arrow C. This draws the cables down and puts them under tension. Because cables 50 are not as long as the maximum distance between connections 53 and 54 the cables will tend to resist rotation of clamp 52 away from handle 20 beyond a distance, as determined by their length and their point of connection to the clamp. However by application of sufficient pressure to stretch the cables slightly, continued rotation of the clamp down away from handle 20 is possible and will tighten the cables down and cause them to overcentre past fasteners 60 (FIG. 1). Once overcentred, cables 50 will drive clamp 52 against rear supports 24 and handle 20 and the rear supports will be locked into their fully extended positions. To unlock the frame in order to permit folding thereof, force will have to be applied to clamp handle 58 in the direction indicated by arrow D to move the cables past fasteners 60 (FIG. 2). As will be appreciated, force applied to clamp handle 58 will move side members 56 to substantially simultaneously lock or unlock both handle 20 and rear supports 24.

As will be appreciated, if cables 50, during an unfolding operation, move forwardly of pins 34, handle 20 and rear supports 24 will be locked from fully unfolding. Therefore, in a preferred embodiment, a cable restraint 65 is mounted on bracket 30 to restrict cable movement behind pins 34. Cable restraint 65 can be, for example, a slot or a rigid rod or a flexible strap connected at each end to bracket 30.

Figure 6:
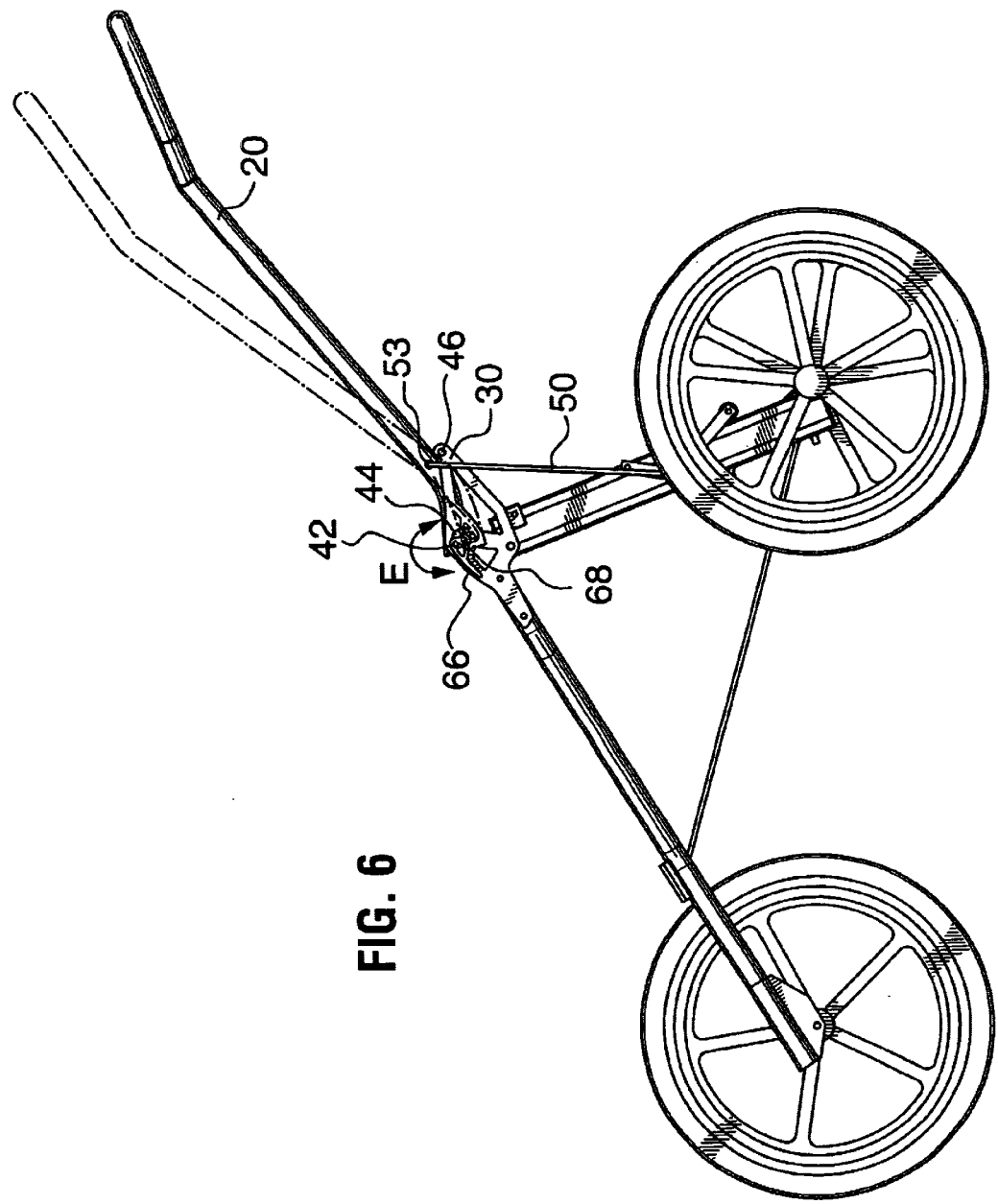
FIG. 6 is a side elevation view of a stroller according to the present invention showing handle height adjustment.

In the preferred embodiment, as best illustrated in FIG. 6, the height of handle 20 is adjustable. Advantageously, such adjustment is made at bracket 30 which is at the front end 20' of handle. This reduces complexity in stroller construction and increases handle rigidity over previous strollers wherein height adjustment occurs at the gripping end or away from the connection of the handle to the frame. Handle height adjustment is simple and user friendly.

In particular, preferably slot 44 is formed as an arc and pin 42 is connected to the handle and rides in the slot. Pin 42 also extends through a lever 66 having a fulcrum at pin 68. Lever 66 can be rotated, as shown by arrows E, about fulcrum pin 68 to drive pin 42 along slot 44 between its ends. This drives end 20' of the handle up and down relative to the bracket. Handle 20 then acts as a lever using stop 46 as a fulcrum which causes gripping portion 21 to be raised and lowered. When pin 42 is in the upper portion of slot 44, the handle will be in a lower gripping position, shown in solid lines in FIG. 6. When pin 42 is rotated to the lower portion of slot 44, the handle will be in an higher gripping position, as shown in phantom.

When cables 50 are locked overcentre, pin 42 is driven into its position at either end of slot 44 and remains firmly in place. Preferably, connection 53 of the cables to the handle is adjacent stop 46. Handle 20 rests against stop 46 and remains positionally fixed adjacent the stop regardless of which height position the handle is in, so that the length and locking of cables 50 is not affected by adjustment of the handle height.

As noted previously, relative wheel positioning is an important consideration with strollers. In particular, relative wheel positioning affects stroller tracking and center of gravity. Off-straight tracking can be caused by manufacturing tolerances and/or by wear and tear. The stroller of the present invention includes a relative wheel positioning mechanism that can be used to adjust tracking and center of gravity. The relative wheel positioning mechanism includes cables 40 that are adjustable in their extended length, as by cable length adjustment screws 70. In particular, cables 40 are secured to screws 70 that thread into threaded apertures 72 on the rear supports 24. It may be desirable to limit the degree to which the cable length can be changed. Alternately it may be desirable to use a cable length modification means, such as a turn buckle, which permits more significant cable length changes.

Since off-straight tracking is caused by misalignment between the front and the rear tires and/or misalignment of the front tire with respect to the long axis of the stroller, adjustment of the lengths of cables 40 will adjust wheel spacing and, thereby, wheel alignment and tracking. If the stroller is tracking to the side, one or both screws 70 can be threaded into or out of the apertures to adjust the tension in the cable to which it is attached. As an example, if the stroller is tracking to the left, the right screw could be tightened to correct this problem.

Center of gravity can be adjusted in part by controlling the distance between the front wheel and the rear wheels. The center of gravity will determine the weight that is placed on the front wheel, which will determine how easily the trailer will tip rearwardly about the rear wheels. The length of one or both cables 40 can be adjusted by screws 70 to adjust the spacing between the wheels and, thereby, the center of gravity.

It will be appreciated, that if considerable changes in the length of cables 40 is to be made, it will be necessary to have a length adjustment means on cables 50 to ensure that proper overcentering at the lock is still achieved.

Figure 7:
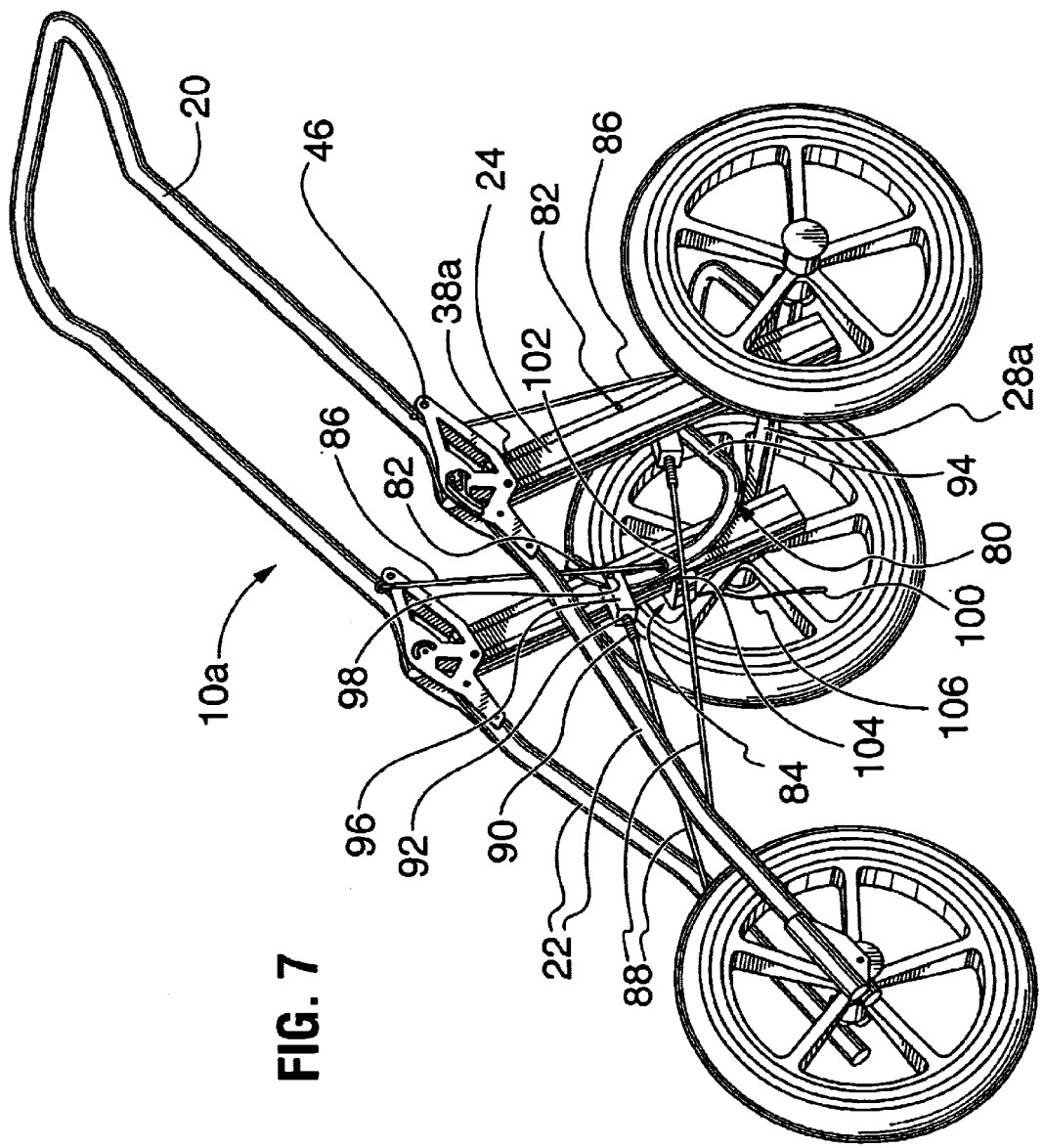
FIG. 7 is a perspective view of another stroller according to the present invention in a position approaching the locked position.
Figure 8:
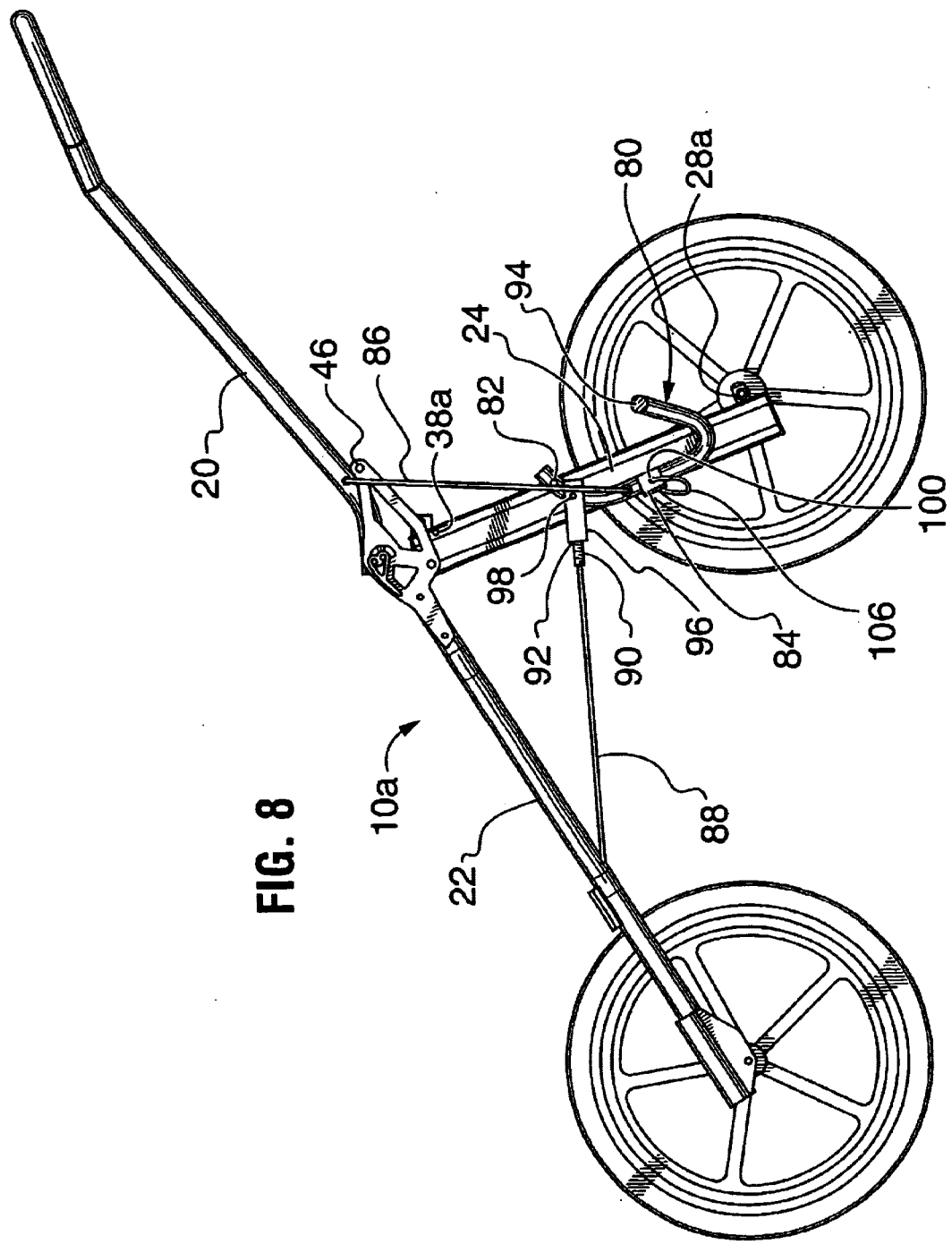
FIG. 8 is sectional view along the long axis of the stroller of FIG. 7 in an upright, locked position ready for use.

Referring to FIGS. 7 and 8 another stroller 10*a* according to the present invention is shown. In some jurisdictions, local regulations concerning stroller manufacture require that the stroller be locked into an upright position ready for use simultaneously when it is unfolded. This prevents the stroller from being used, by mistake, to transport a child when it is not yet locked into position for proper use.

Thus, in the stroller of FIG. 7 the frame members will be automatically locked into a fully extended position ready for proper use as soon as the stroller is fully unfolded, without a separate, manual lock actuation step. In particular, stroller 10*a* includes a locking lever 80 pivotally connected to rear supports 24 by pins 82.

A cross member 88, formed of substantially inextensible cable, extends between front forks 22 and each side of the locking lever. By transferring tension from the cross members 88 through the locking lever to the rear supports, cross members 88 are useful for strengthening the frame and maintaining the spacing between the front and rear wheels. By use of thumbscrew 90 in threaded rivets 92, the extended length of each cross member 88 can be adjusted to control the relative positioning of the wheels.

Stops 84 are also mounted to the rear supports and are positioned to limit the rotational movement of locking lever 80 toward front forks 22. Lock cables 86 are secured on each side of the stroller between handle 20 and the locking lever. Lock cables 86 are similar in operation to the cables 50 of FIGS. 1 to 6 and are secured such that rotation of locking lever 80 towards stops 84 will cause the cables to over centre relative to pins 82, thereby acting to lock lever 80 against stops 84.

Overcentering of the cables relative to pins 82 causes the trailer to be locked in an upright position ready for use. In particular, handle 20 will be locked against stop 46 and rear supports 24 are locked against the tension in cross members 88 or against stops 38*a*. To fold the trailer, sufficient pressure is applied to move cables 86 past pins 82 and to rotate locking lever 80 away from stops 84. Locking lever 80 can include an upwardly curved portion 94 between the two side portions so that the force to collapse the trailer for folding can be applied by inserting the user's foot between the rear axle housing 28*a* and the lever to provide adequate force to move the locking cables past pins 82.

The locking arrangement as shown in FIGS. 7 and 8 is actuated automatically upon unfolding the stroller. In particular, the mounting of cross members 88 to locking lever 80 causes the locking lever to be drawn down toward stops 84 as soon as rear supports 24 are pivoted away from front forks 22, placing the cross members under tension. When the stroller is placed on its wheels, locking lever 80 will be in a close to a locked position. Once the handle is moved back to rest against stops 46 and moderate downward pressure is applied to the stroller, cross members 88 will pull lever 80 into a locked, over centre position. To ease movement of the cross members relative to the locking lever, preferably cross members 88 are each pivotally connected to the locking lever through a bracket 96. Bracket 96 at one end is secured to its cross member 88 via threaded rivet 92 and at its opposite end is pivotally secured to lever 80 through pins 98. Pin 82 can extend outwardly from lever 80 to act as a stop for bracket 96 so that lever 80 is prevented from rotating toward handle 20 so far that the cross members are over centred past pins 82. This prevents the lever from locking up against the upper end of the rear wheel supports during the unfolding operation.

To prevent inadvertent release of locking lever 80 from its locked position, a safety lock such as a pin 100 can be inserted through alignable apertures 102, 104 in lever 80 and at least one of stops 84. Pin 100 can be attached to the trailer adjacent its stop via a cord 106. It will be appreciated that pin 100 can also operate by passing through at least one of stops 84 or rear wheel supports 24 and simply trapping lever 80 against stops 84 rather than passing through the lever. It will also be appreciated that pin 100 could be replaced with a spring biased detent or other means.

Referring to FIG. 9, a stroller is shown complete with seat and sun shade. The stroller has a covering that enhances the ride for the child to be seated therein. In one aspect, seat 18*a* of the stroller has a bottle holder 110 incorporated therein which is conveniently positioned for access by the child passenger without crowding the child or requiring expansion of the seating area. In particular, bottle holder 110 is positioned in the front facing panel 112 of the seat. In this position any bottle contained in holder 110 will be located between the child's legs, which is an area normally open, as the child tends to rest its legs against the sides of the seat. Of course depending on the size of the seat, the bottle holder could be located in the top support area of the seat at its front edge. The bottle holder can be formed of an desired material and be incorporated into the seat in any desired way, as by sewing, adhesives or polymeric welding. However, preferably the bottle holder is formed of a flexible material such as mesh or materials useful for stroller coverings and is sewn into position. A thermo-insulative lining can be used, if desired.

In another aspect, the trailer includes a sunshade 116 including a visor 118. The visor includes a stiffening member 120 which maintains the visor in a lowered, forward in-use position. The stiffening member prevents the main portion of the visor from flapping in the breeze generated from pushing the stroller, especially at high, for example jogging, speeds. Preferably stiffening member 120 can be adjusted, arrow F, between the in-use position and a stored position shown in phantom as 120'. In one embodiment, stiffening member 120 is formed of a pliant material to which force can be applied to move the visor between the two positions. In another embodiment, the visor is formed of a stiff material such a tinted translucent polymeric material mounted to spring between the stored configuration and the in-use configuration. In the illustrated embodiment, the stiffening member is a spring steel wire and is mounted in a pocket 124 formed adjacent the edge of the visor. Force applied to the wire can spring the visor between the two positions.

The visor can be formed of any desired opaque, translucent or clear materials and can be attached to the stroller in any desired way, as by welding, sewing or adhesives.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A stroller having a forward end and a rear end and a long axis extending through the forward end and the rear end, the stroller comprising: a plurality of wheels for supporting the stroller including at least one front wheel positioned forward of the stroller's centre of gravity and rear wheels; a frame supported by the wheels having main frame members including (a) front wheel supports for engaging the at least one front wheel, (b) a handle bar for grasping and moving the stroller and (c) rear supports securing and extending upwardly from the rear wheels; a seat supported by the frame and a flexible, elongate cross member extending to act between at least two of the main frame members to control the spacing between the main frame members.

2. The stroller of claim 1 wherein the flexible elongate cross member is substantially inextensible.

3. The stroller of claim 1 wherein the flexible elongate cross member has a capability of limited stretch under loads beyond a selected level to provide a suspension effect.

4. The stroller of claim 1 wherein the flexible elongate cross member is secured in fixed positions on the at least two main frame members between which it extends.

5. The stroller of claim 1 further comprising a mechanism for adjusting the length of the flexible elongate cross member to control the spacing between the at least two main frame members.

6. The stroller of claim 5 wherein the mechanism for adjusting the length of the flexible elongate cross member is operable to adjust the length while the flexible elongate cross member remains extended between the at least two main frame members.

7. The stroller of claim 1 wherein the flexible elongate cross member is secured to a part connected to a main frame member.

8. The stroller of claim 7 wherein the part includes a mechanism for adjusting the extended length between the at least two main frame members.

9. The stroller of claim 8 wherein the mechanism for adjusting the extended length is operable to adjust the length while the flexible elongate cross member remains extended between the at least two main frame members.

10. The stroller of claim 1 further comprising a tension adjustment means for selecting the tension in the flexible elongate cross member as it extends between the main frame members.

11. The stroller of claim 1 wherein the flexible elongate cross member is included in an over-center mechanism for providing frame rigidity between the at least two main frame members.

12. The stroller of claim 1 wherein the flexible elongate cross member acts between the front wheel supports and the rear supports to limit the spacing therebetween.

13. A stroller having a forward end and a rear end and a long axis extending through the forward end and the rear end, the stroller comprising:

a plurality of wheels for supporting the stroller including at least one front wheel positioned forward of the stroller's centre of gravity, a left rear wheel and a right rear wheel; a frame supported by the wheels and configurable into an upright position for use, the frame including front wheel supports securing and extending rearwardly from the at least one front wheel, a handle bar for grasping and moving the stroller, a left rear support securing and extending upwardly from the left rear wheel and a right rear support securing and extending upwardly from the right rear wheel; a seat supported by the frame; and a relative wheel positioning means for selecting and maintaining the spacing of the at least one front wheel relative to at least one of the left rear wheel and the right rear wheel when the frame is in the upright position.

14. The stroller of claim 13 wherein the stroller includes a front wheel and the relative wheel positioning means includes a mechanism for adjusting the spacing between the front wheel and each of the left and right rear wheels.

15. The stroller of claim 13 wherein the stroller includes right-side front and rear wheels and left-side front and rear wheels, and the relative wheel positioning means includes a mechanism for adjusting the spacing between the right-side front and rear wheels and the left-side front and rear wheels.

16. The stroller of claim 13 wherein the relative wheel positioning means is two elongate members each one extending to act between the front wheel supports and one of the rear supports to control the spacing therebetween.

17. The stroller of claim 16 wherein the elongate members are substantially inextensible.

18. The stroller of claim 16 further comprising a mechanism for adjusting the length of each elongate member.

19. The stroller of claim 18 wherein the mechanism is operable to adjust the length while the elongate members remain extending between the front wheel supports and the rear wheel supports.

20. The stroller of claim 16 wherein the elongate members each include a flexible elongate portion.

21. The stroller of claim 18 wherein the elongate members each include a flexible elongate portion.

22. A stroller having a forward end and a rear end and a long axis extending through the forward end and the rear end, the stroller comprising:

a plurality of wheels for supporting the stroller including at least one front wheel positioned forward of the stroller's centre of gravity, a left rear wheel and a right rear wheel; a frame supported by the wheels including front wheel supports securing and extending rearwardly from the at least one front wheel, a left rear support securing and extending upwardly from the left rear wheel, a right rear support securing and extending upwardly from the right rear wheel, and a handle bar for grasping and moving the stroller including a gripping portion, the handle bar being connected into the frame by a pivotal connection and the pivotal connection being incorporated into a lever mechanism for driving the handle bar against a fulcrum to permit handle height adjustment with respect to the stroller, the mechanism for handle height adjustment including: a slot on the frame; a pin secured to the handle and slidably engaged in the slot, the pin being slideably moveable in the slot between a first position and a second position to drive the handle bar against the fulcrum such that the gripping portion of the handle bar is moved into a higher position when the pin is in the first position and the gripping portion of the handle bar is in a lower position when the pin is in the second position; and a releasable lock to maintain the pin in the first position or the second position during use; and a seat supported by the frame.

23. The stroller of claim 22 wherein the slot is formed as an arc and the first position and the second position are the ends of the slot and the lock is a mechanism for driving the pin against the ends of the slot.

24. A stroller having a forward end and a rear end and a long axis extending through the forward end and the rear end, the stroller comprising:

a plurality of wheels for supporting the stroller including at least one front wheel positioned forward of the stroller's centre of gravity and rear wheels; a frame supported by the wheels having main frame members including front wheel supports for engaging the at least one front wheel, a handle bar for grasping and moving the stroller and rear wheel supports for engaging the rear wheels; a seat supported by the frame; a connecting bracket on each side of the frame having connected thereto the main frame members and at least two of the main frame members being pivotally moveable at their connection to the connecting brackets and the connecting bracket positioned to permit the at least two main frame members to pivot about the connecting bracket such that the stroller can be manipulated between an upright position and a folded position; and a locking means for releasably locking the stroller in the upright position, the locking means selected such that its operation controls pivoting of both of the at least two frame members.

25. The stroller of claim 24 wherein the front wheel supports are rigidly connected to the connecting brackets, while the handle and rear wheel supports are pivotally connected to the connecting brackets.

26. The stroller of claim 25 wherein the connecting bracket includes a mechanism for handle height adjustment.

27. The stroller of claim 26 wherein the mechanism for handle height adjustment is incorporated into the handles pivotal connection to the connecting bracket.

28. The stroller of claim 24 wherein the locking means acts to control pivoting of the handle bar and the rear wheel supports.

29. The stroller of claim 24 wherein the locking means includes a cable and an over-center clamp to draw the cable into a tensioned configuration between the at least two main frame members to restrain them against pivoting.

30. The stroller of claim 24 wherein the locking means includes a cable on each side of the stroller and an over-center clamp extending therebetween, the cables being clampable in a tensioned configuration to lock the at least two main frame members against pivoting.

31. The stroller of claim 30 wherein the cable is connected between the handle bar and the over-center clamp and the over-center clamp is connected to one of the rear supports on each side, such that the cables can be tensioned to draw and lock the handle bar and the rear supports against stops.

32. The stroller of claim 31 wherein the over-center clamp is driven to draw the cables into the tensioned configuration by rotating it downwardly toward the rear wheels.

33. The stroller of claim 24 wherein the locking means is actuated to automatically lock as the stroller is unfolded.

34. The stroller of claim 33 wherein the locking means includes a cable on each side of the stroller and an over-center clamp extending therebetween, the cables being clampable by the over-center clamp into a tensioned configuration to lock the at least two main frame members against pivoting, the over-center clamp being drawn to over-center as the stroller is unfolded.

35. The stroller of claim 24 further comprising a second lock for releasably locking the locking means into a locked configuration.

36. A stroller having a forward end and a rear end and a long axis extending through the forward end and the rear end, the stroller comprising: a plurality of wheels for supporting the stroller including at least one front wheel positioned forward of the stroller's center of gravity and rear wheels; a frame supported by the wheels having main frame members including (a) front wheel supports for engaging the at least one front wheel, (b) a handle bar for grasping and moving the stroller and (c) rear supports securing and extending upwardly from the rear wheels; a seat supported by the frame and a flexible, elongate cross member extending to act between at least two of the main frame members to control the spacing between the main frame members, the flexible elongate cross member being secured to a part connected to a main frame member, the part including a mechanism for adjusting the extended length between the at least two main frame members.

37. The stroller of claim 36 wherein the mechanism for adjusting the extended length is operable to adjust the length while the flexible elongate cross member remains extended between the at least two main frame members.

38. A stroller having a forward end and a rear end and a long axis extending through the forward end and the rear end, the stroller comprising: a plurality of wheels for supporting the stroller including at least one front wheel positioned forward of the stroller's center of gravity and rear wheels; a frame supported by the wheels having main frame members including (a) front wheel supports for engaging the at least one front wheel, (b) a handle bar for grasping and moving the stroller and (c) rear supports securing and extending upwardly from the rear wheels; a seat supported by the frame; a flexible, elongate cross member extending to act between at least two of the main frame members to control the spacing between the main frame members; and a tension adjustment means for selecting the tension in the flexible elongate cross member as it extends between the main frame members.

39. A stroller having a forward end and a rear end and a long axis extending through the forward end and the rear end, the stroller comprising: a plurality of wheels for supporting the stroller including at least one front wheel positioned forward of the stroller's center of gravity, a left rear wheel and a right rear wheel; a frame supported by the wheels including front wheel supports securing and extending rearwardly from the at least one front wheel, a left rear support securing and extending upwardly from the left rear wheel, a right rear support securing and extending upwardly from the right rear wheel; and a handle bar for grasping and moving the stroller including a gripping portion, the handle bar being connected into the frame by a pivotal connection including a pin connected to the handle bar; a seat supported by the frame and a mechanism for handle height adjustment with respect to the stroller including a slot on the frame, the pin being engaged and slideably moveable in the slot between a first position and a second position to drive the handle bar against a fixed fulcrum such that the gripping portion of the handle bar is moved into a higher position when the pin is in the first position and the gripping portion of the handle bar is in a lower position when the pin is in the second position and a releasable lock to maintain the pin in the first position or the second position during use.

40. The stroller of claim 39 wherein the slot is formed as an arc and the first position and the second position are the ends of the slot and the lock is a mechanism for driving the pin against the ends of the slot.

* * * * *